United States Patent
Ando

(10) Patent No.: US 11,186,240 B2
(45) Date of Patent: Nov. 30, 2021

(54) GROMMET

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/071,185

(22) Filed: Oct. 15, 2020

(65) Prior Publication Data

US 2021/0129774 A1 May 6, 2021

(30) Foreign Application Priority Data

Oct. 30, 2019 (JP) .............................. JP2019-197306

(51) Int. Cl.
*B60R 16/00* (2006.01)
*B60R 16/02* (2006.01)

(52) U.S. Cl.
CPC ................................ *B60R 16/0222* (2013.01)

(58) Field of Classification Search
CPC ......................... B60R 16/0222; H01B 17/583
See application file for complete search history.

(56) References Cited

U.S. PATENT DOCUMENTS

| | | | | |
|---|---|---|---|---|
| 6,442,794 B2 * | 9/2002 | Uchida | ............... | B60R 16/0222 16/2.1 |
| 6,495,767 B2 * | 12/2002 | Okuhara | ............. | B60R 16/0222 16/2.1 |
| 6,637,070 B2 * | 10/2003 | Katayama | ................ | H02G 3/22 16/2.1 |
| 6,675,439 B2 * | 1/2004 | Hashimoto | ......... | B60R 16/0222 16/2.1 |
| 6,897,380 B2 * | 5/2005 | Sakata | ................ | B60R 16/0222 16/2.1 |
| 8,299,364 B2 * | 10/2012 | Suzuki | ................ | B60R 16/0222 174/152 G |
| 8,835,778 B2 * | 9/2014 | Matsumoto | ......... | B60R 16/0222 174/650 |

FOREIGN PATENT DOCUMENTS

JP     2012-239321 A     12/2012

* cited by examiner

*Primary Examiner* — Pete T Lee

(74) *Attorney, Agent, or Firm* — Abelman, Frayne & Schwab

(57) ABSTRACT

A first grommet includes a first tube-shaped portion for covering the outer periphery of the wire harness, and an expanded tube portion that expands in diameter and extends from the first tube-shaped portion, and at an end portion on the expanded side, has a seal portion into which the peripheral edge of the attachment hole Pa is to be fit. The covering portion protrudes from the outer peripheral surface of the first tube-shaped portion in a state of being inclined toward the expanded tube portion in the axial direction of the first tube-shaped portion. Also, a first protruding portion that protrudes outward in the radial direction from the outer peripheral surface of the first tube-shaped portion and is connected to the side surface on the expanded tube portion side in the axial direction of the covering portion is formed between the covering portion and the expanded tube portion.

5 Claims, 5 Drawing Sheets

GROMMET

CROSS-REFERENCE TO RELATED APPLICATIONS

This application is based on and claims priority from Japanese Patent Application No. 2019-197306, filed on Oct. 30, 2019, with the Japan Patent Office, the disclosure of which is incorporated herein in their entireties by reference.

TECHNICAL FIELD

The present disclosure relates to a grommet.

BACKGROUND

Conventionally, as described in Japanese Patent Laid-open Publication No. 2012-239321 for example, there has been a grommet that is mounted in an attachment hole formed through a vehicle body panel separating a vehicle interior and a vehicle exterior, the grommet protecting a wire harness inserted through the attachment hole. In the configuration described in Japanese Patent Laid-open Publication No. 2012-239321, a sound insulation member is adhered to one side surface of the vehicle body panel. An insertion hole into which a wire harness is inserted is formed at a position of the sound insulation member corresponding to the attachment hole of the vehicle body panel. Then, an umbrella-shaped covering portion that covers the through hole of the sound insulation member is formed in a grommet mounted in the attachment hole of the vehicle body panel.

The inventor of the present invention performed studies for improving the insertability of the above-described grommet by using a configuration in which the umbrella-shaped covering portion is not likely to be caught between the attachment hole and the grommet main body portion when the grommet is inserted into the attachment hole of the vehicle body panel from the side opposite to the sound insulation member.

In view of this, an object is to provide a grommet that enables improvement of insertability into the attachment hole.

SUMMARY

The grommet of the present disclosure is a grommet including a grommet main body portion configured to be interposed between an attachment hole provided in a vehicle body panel and a wire harness passed through the attachment hole, and a covering portion for covering an insertion hole in a sound insulation member provided on one side surface of the vehicle body panel. The grommet main body portion includes a tube-shaped portion for covering an outer periphery of the wire harness, and an expanded tube portion that expands in diameter and extends from the tube-shaped portion, and at an end portion on the expanded side, has a seal portion into which a peripheral edge of the attachment hole is to be fit. The covering portion extends from an outer peripheral surface of the tube-shaped portion in a state of being inclined toward the expanded tube portion in the axial direction of the tube-shaped portion. A protruding portion that protrudes outward in the radial direction from the outer peripheral surface of the tube-shaped portion and is connected to the side surface on the expanded tube portion side in the axial direction of the covering portion is formed between the covering portion and the expanded tube portion.

According to the present disclosure, it is possible to provide a grommet that enables improvement of insertability into the attachment hole.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
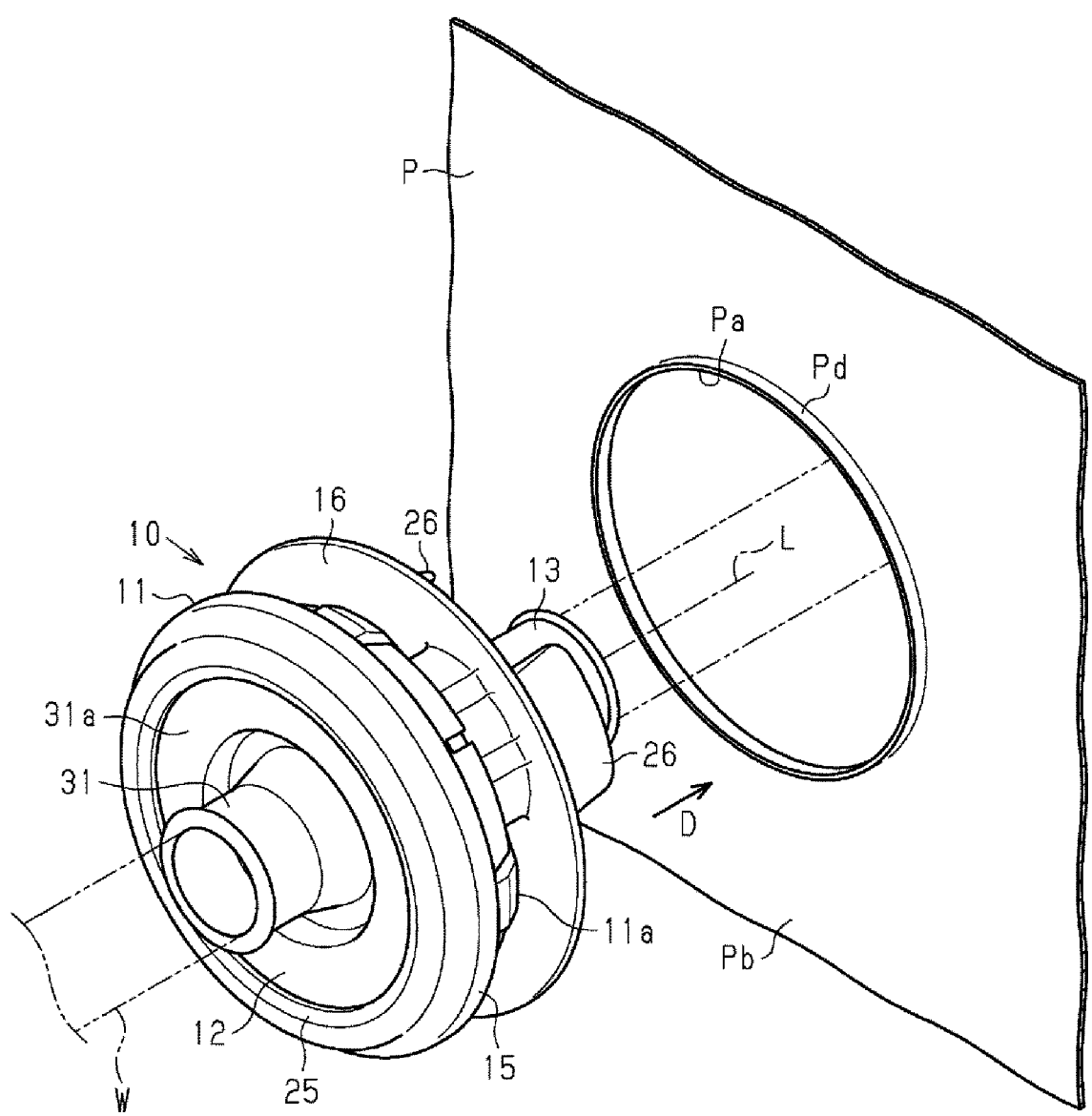
FIG. 1 is a perspective view of a grommet of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of the Embodiments of the Disclosure

First, embodiments of the present disclosure will be listed and described.

[1] The grommet of the present disclosure is a grommet including a grommet main body portion configured to be interposed between an attachment hole provided in a vehicle body panel and a wire harness passed through the attachment hole, and a covering portion for covering an insertion hole in a sound insulation member provided on one side surface of the vehicle body panel. The grommet main body portion includes a tube-shaped portion for covering an outer periphery of the wire harness, and an expanded tube portion that expands in diameter and extends from the tube-shaped portion, and at an end portion on the expanded side, has a seal portion into which a peripheral edge of the attachment hole is to be fit. The covering portion extends from an outer peripheral surface of the tube-shaped portion in a state of being inclined toward the expanded tube portion in the axial direction of the tube-shaped portion. A protruding portion that protrudes outward in the radial direction from the outer peripheral surface of the tube-shaped portion and is connected to the side surface on the expanded tube portion side in the axial direction of the covering portion is formed between the covering portion and the expanded tube portion.

According to this configuration, the connecting portion between the covering portion and the end portion on the outer side in the radial direction of the protruding portion that protrudes from the outer peripheral surface of the tube-shaped portion acts as a fulcrum for deformation when the covering portion abuts on the peripheral edge of the attachment hole and collapses during attachment of the grommet. Accordingly, due to the protruding portions being formed, it is possible to suppress the amount of displacement in the axial direction of the end portion on the outer side in the radial direction of the covering portion to a small amount. As a result, when the grommet is inserted into the attachment hole of the vehicle body panel from the side opposite to the sound insulation member, it is possible to achieve a configuration in which the covering portion is not likely to be caught between the attachment hole and the grommet main body portion, and the insertability of the grommet into the attachment hole can be improved.

[2] It is preferable that a plurality of the protruding portions are provided with intervals therebetween in the peripheral direction.

According to this configuration, it is possible to more suitably suppress the covering portion from being caught in the attachment hole using the multiple protruding portions. Also, the amount of the material of the grommet can be suppressed to a small amount compared to the case where the protruding portion is formed over the entire circumference of the tube-shaped portion.

[3] It is preferable that the protruding portion is formed along the axial direction from the covering portion to the expanded tube portion.

According to this configuration, due to the protruding portion also being connected to the expanded tube portion, warping of the protruding portion is suppressed, and as a result, the amount of displacement in the axial direction of the end portion on the outer side in the radial direction of the covering portion can be more suitably suppressed by the protruding portions.

[4] It is preferable that the protruding portion is a first protruding portion, a second protruding portion that extends in a radial direction in a view from the axial direction is formed on the outer peripheral surface of the expanded tube portion, and the second protruding portion is connected to the end portion in the axial direction of the first protruding portion.

According to this configuration, the rigidity of the expanded tube portion can be improved by the second protruding portion.

Detailed Description of the Embodiments of the Disclosure

A specific example of the grommet of the present disclosure will be described hereinafter with reference to the drawings. Note that the present invention is not limited to these illustrations but is indicated by the claims, and all modifications within the meaning and scope of equivalence to the claims are intended to be encompassed therein. In the drawings, for the sake of convenience in the description, portions of the configuration are emphasized or simplified in some cases. Also, dimensional proportions of the portions are different from the actual dimensional proportions in some cases.

A grommet 10 shown in FIG. 1 is attached to an attachment hole Pa that is formed through a vehicle body panel P that separates the interior and the exterior of the automobile, and protects a wire harness W that is passed through the attachment hole Pa. The grommet 10 also plays a role of ensuring a water sealing property of the attachment hole Pa of the vehicle body panel P. Note that the wire harness W is constituted by including at least one wire. Also, an axial direction L of the grommet 10 matches an insertion direction in which the wire harness W is inserted into the grommet 10.

The grommet 10 is inserted in the insertion direction D along the axis L of the grommet 10 into the attachment hole Pa of the vehicle body panel P. In the following description, frontward and rearward in the insertion direction D of the grommet 10 are described simply as frontward and rearward, and are described as being frontward in the axis L direction and rearward in the axis L direction in some cases. Also, in the following description, the peripheral direction about the axis L and the radial direction about the axis L are respectively described simply as the peripheral direction and the axial direction in some cases.

Note that so-called burring, in which the peripheral edge is curved in a thickness direction of the vehicle panel P, is carried out on the attachment hole Pa of the vehicle panel P. In the present embodiment, a protruding portion Pd that protrudes toward a side surface Pb facing the exterior side of the vehicle body panel P is formed on the peripheral edge of the attachment hole Pa. The protruding portion Pd is bent in an approximately right angle with respect to the side surface Pb of the vehicle body panel P.

The grommet 10 includes a first grommet 11 and a second grommet 12 that is attached to the first grommet 11. The first grommet 11 and the second grommet 12 are separate from each other. The first grommet 11 and the second grommet 12 are made of an elastic material such as rubber. Note that examples of the elastic material used in the first grommet 11 and the second grommet 12 include EPDM (ethylene propylene diene rubber). Although the elastic material used in the first grommet 11 and the elastic material used in the second grommet 12 may also be the same material or different materials, it is preferable to also use an elastic material such as rubber that is flexible.

(First Grommet 11)

Figure 2:
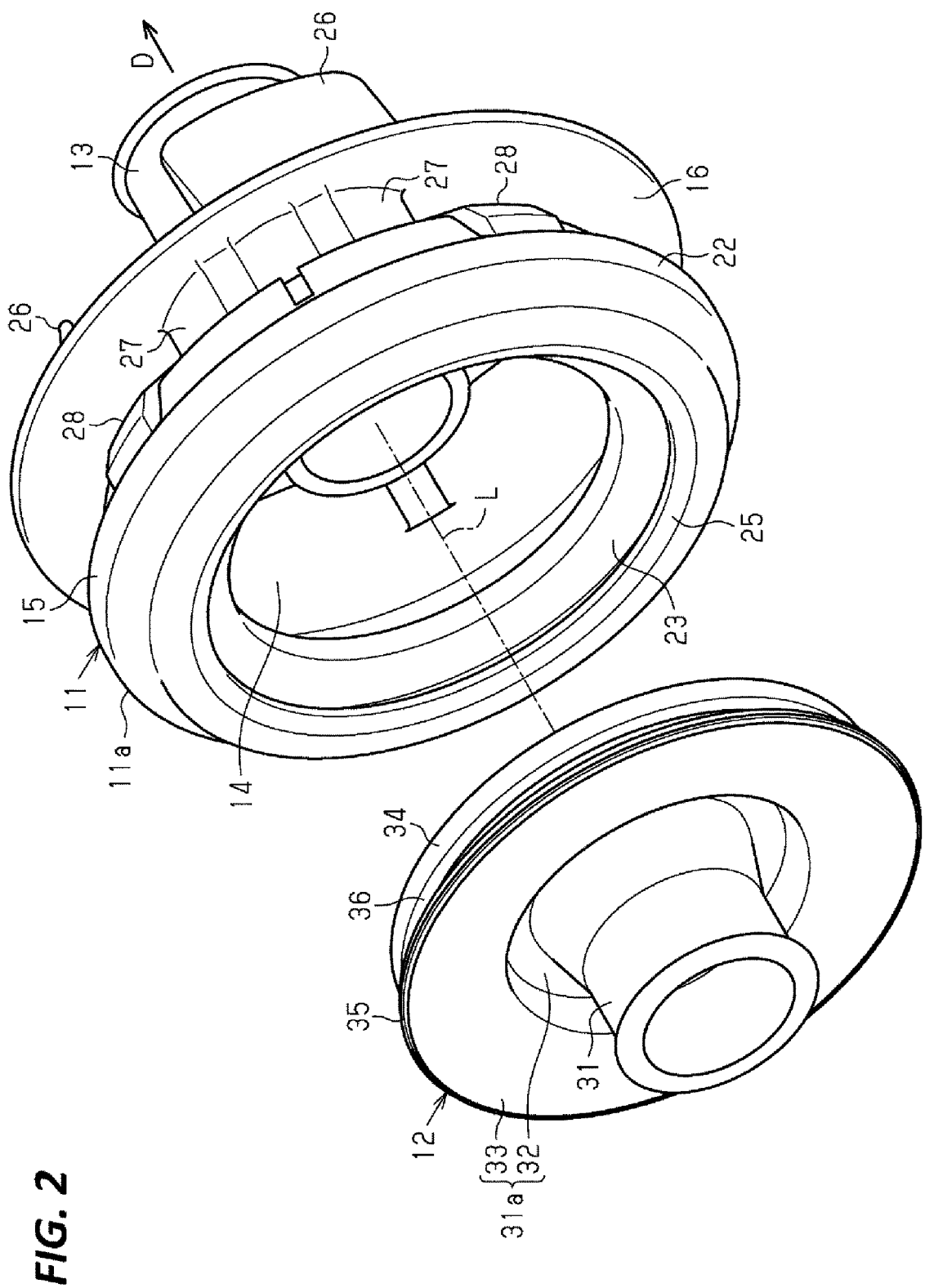
FIG. 2 is an exploded perspective view of the grommet of the embodiment.
Figure 3:
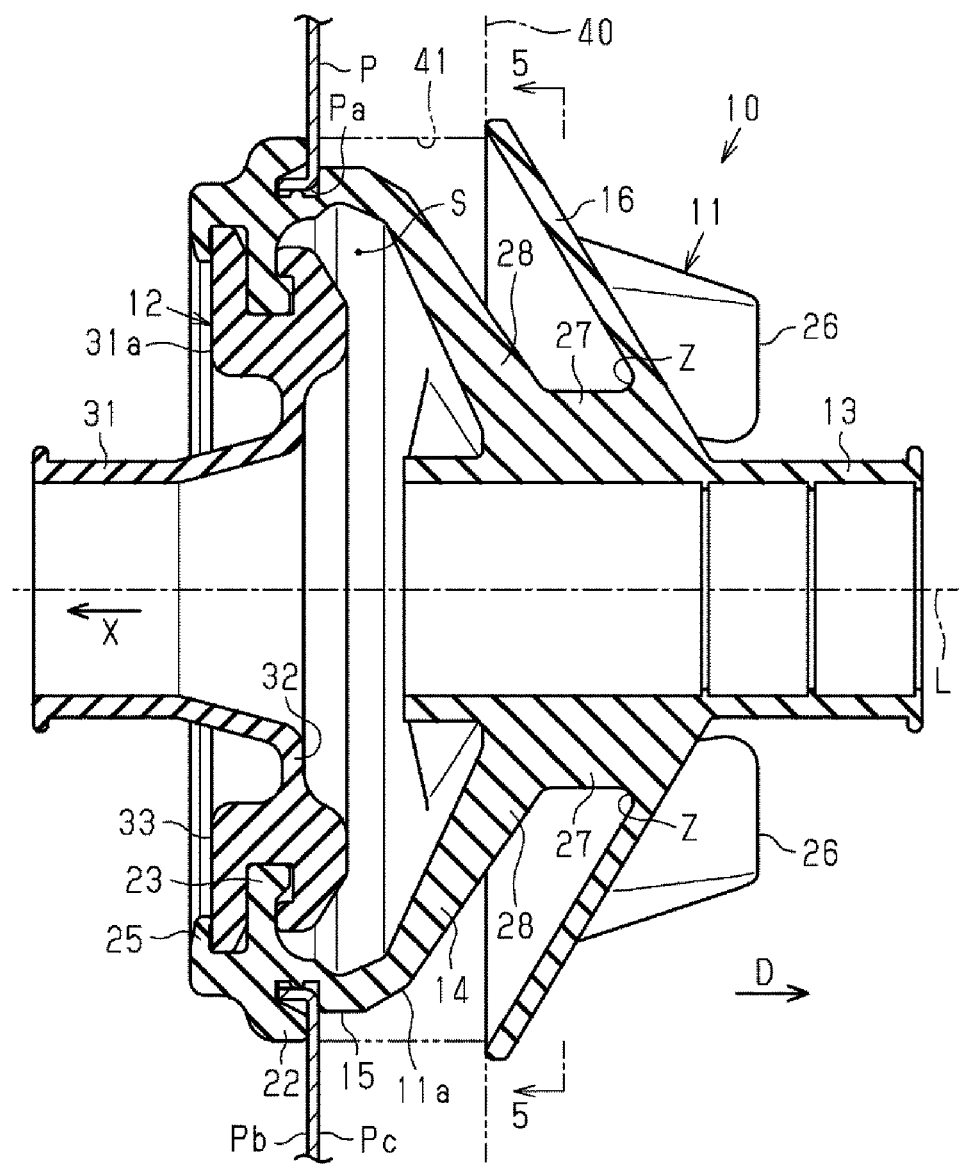
FIG. 3 is a cross-sectional view of the grommet of the embodiment.

As shown in FIGS. 2 and 3, the first grommet 11 includes a tube-shaped first tube-shaped portion 13 that covers the outer periphery of the wire harness W, an expanded tube portion 11a that expands in diameter and extends rearward from the first tube-shaped portion 13. Note that in the present embodiment, the portion including the first tube-shaped portion 13 and the expanded tube portion 11a corresponds to the grommet main body portion.

The cross-sectional shape of the first tube-shaped portion 13 orthogonal to the axis L of the grommet 10 has a circular ring shape that is centered about the axis L. The wire harness W is inserted into the first tube-shaped portion 13 in a state in which the water sealing property is ensured.

The expanded tube portion 11a includes an expanded portion 14 that expands in diameter and extends from the outer peripheral surface of the first tube-shaped portion 13 and a seal portion 15 that is formed on the rear end side of the expanded portion 14. The expanded portion 14 has a circular shape centered about the axis L direction in a view from the axis L direction. The expanded portion 14 has a tapered shape that expands in diameter toward the rear end side of the axis L direction. The outer peripheral edge of the expanded portion 14 has a ring shape that conforms to the peripheral edge of the attachment hole Pa.

The seal portion 15 is formed at the end portion on the expanded side of the expanded tube portion 11a. Note that in the present embodiment, the end portion on the expanded side of the expanded tube portion 11a is the end portion on the rear side in the axis L direction of the expanded tube portion 11a. The seal portion 15 is formed so as to protrude rearward from the outer peripheral edge of the expanded portion 14, that is, the rear end portion of the expanded portion 14. The seal portion 15 has an approximately circular tube shape centered about the axis L.

Figure 4:
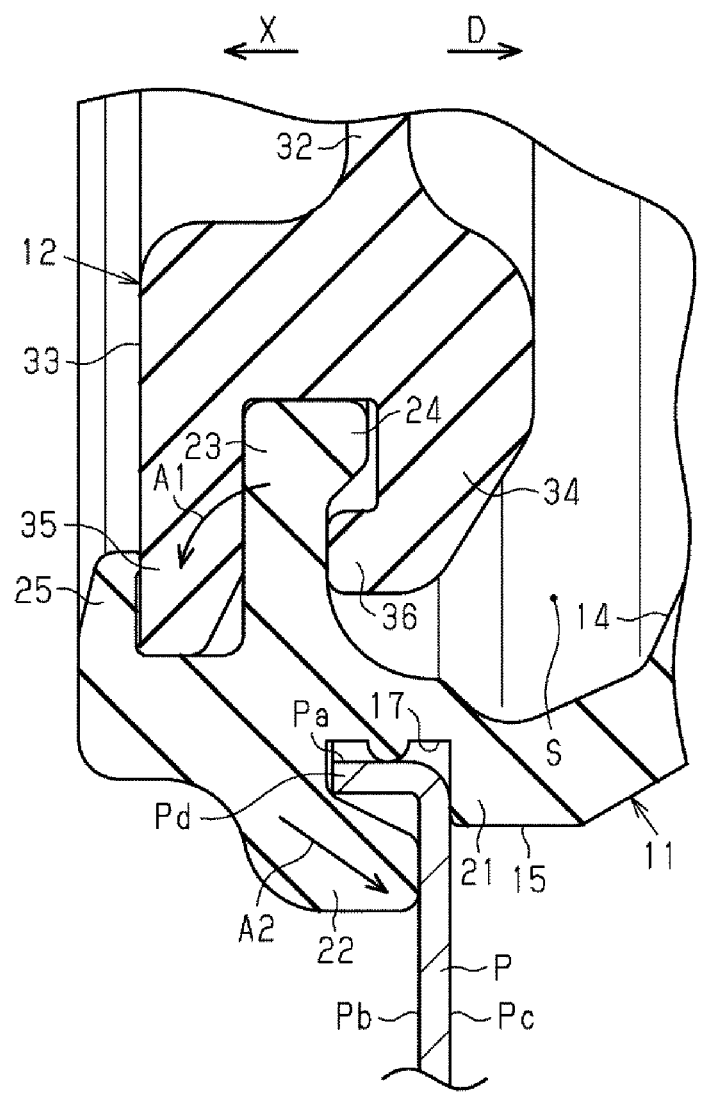
FIG. 4 is an enlarged cross-sectional view of a main portion of the grommet of the embodiment.

As shown in FIG. 4, an outer peripheral groove 17 into which the peripheral edge of the attachment hole Pa enters is formed on the outer peripheral surface of the seal portion 15. The outer peripheral groove 17 is formed over the entire periphery of the seal portion 15 so as to have a ring shape centered about the axis L. Also, the seal portion 15 includes a brim portion 21 that is formed on the frontward side in the axis L direction with respect to the outer peripheral groove 17, and a lip portion 22 that is formed on the rearward side in the axis L direction with respect to the outer peripheral groove 17. The brim portion 21 and the lip portion 22 have circular ring shapes that are centered about the axis L.

In the state in which the grommet 10 is attached to the attachment hole Pa, the peripheral edge of the attachment hole Pa has entered the outer peripheral groove 17. In this state, the lip portion 22 extends from a position on the outer circumferential side of the protruding portion Pd of the attachment hole Pa and comes into contact with the side surface Pb of the vehicle body panel P, and the brim portion 21 comes into contact with the side surface Pc on the side opposite to the side surface Pb.

The expanded tube portion 11a has a joining piece 23 that extends inward in the radial direction from the inner peripheral surface of the seal portion 15. The joining piece 23 is formed over the entire periphery of the seal portion 15 so as to have a ring shape centered about the axis L. The base end portion (end portion on the outer side in the radial direction) that connects to the seal portion 15 of the joining piece 23 is the position on the rearward side with respect to the brim portion 21 in the axis L direction, and is set at the same position as the base of the lip portion 22. That is, the joining piece 23 extends from a position on the inner side in the radial direction of the lip portion 22. A protrusion 24 that protrudes frontward in the axis L direction is formed on the inner peripheral edge of the joining piece 24. The protrusion 24 is formed over the entire periphery of the joining piece 23.

Also, the expanded tube portion 11a has a holding piece 25 that extends inward in the radial direction from the rear end portion of the seal portion 15. The holding piece 25 is formed over the entire periphery of the seal portion 15 so as to form a ring shape centered about the axis L.

As shown in FIGS. 2 and 3, a sound insulation member 40 that is adhered to the side surface Pc of the vehicle body panel P is provided. Note that unwoven cloth, a rubber plate, a foam layer, or the like can be used as the sound insulation member 40. The insertion hole 41 into which the wire harness is inserted is formed at the position corresponding to the attachment hole Pa of the sound insulation member 40. The covering portion 16 is configured to close the insertion hole 41 of the sound insulation member 40.

The covering portion 16 extends outward in the radial direction from the first tube-shaped portion 13. The covering portion 16 has a tapered shape that expands in diameter toward the rear end side in the axis L direction. The covering portion 16 has a circular shape centered about the axis L direction in a view from the axis L direction. Also, in the state in which the grommet 10 is attached to the vehicle body panel P, the outer peripheral edge of the covering portion 16 elastically abuts on the sound insulation member 40.

Multiple guide portions 26 that protrude toward the frontward side are formed at equal intervals in the peripheral direction on the surface on the rearward side in the axis L direction of the covering portion 16. When the grommet 10 is inserted into the attachment hole Pa, first, the grommet 10 is inserted in the insertion direction D while the guide portions 26 abut on the peripheral edge of the attachment hole Pa.

Figure 5:
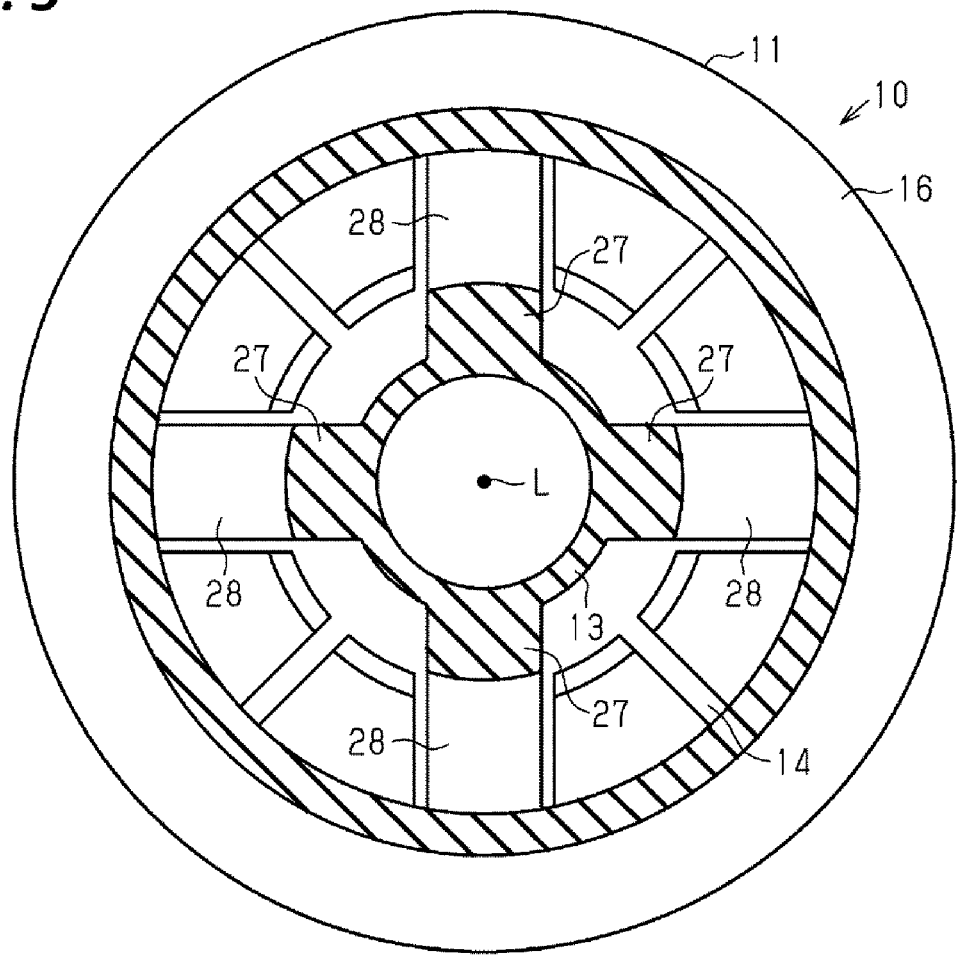
FIG. 5 is a cross-sectional view taken along line 5-5 in FIG. 3.

As shown in FIGS. 2, 3, and 5, the first grommet 11 includes first protruding portions 27 that protrude outward in the radial direction from the outer peripheral surface of the first tube-shaped portion 13 between the covering portion 16 and the expanded portion 14. The multiple first protruding portions 27 are formed at equal intervals in the peripheral direction. Four of the first protruding portions 27 of the present embodiment are provided at 90 degree intervals. The first protruding portions 27 are formed in the axis L direction over the expanded portion 14 from the covering portion 16. That is, the front end portions in the axis L direction of the first protruding portions 27 are continuously connected to the covering portion 11, and the rear end portions in the axis L direction of the first protruding portions 27 are continuously connected to the expanded portion 17. The thickness in the radial direction of the first tube-shaped portion 13 is greater at the portion at which the first protruding portions 27 are formed.

Also, the second protruding portions 28 that are continuously connected to the first protruding portions 27 are formed on the outer peripheral surface of the expanded portion 14 (surface on the frontward side in the axis L direction). With the grommet 10 of the present embodiment, the same number of second protruding portions 27 as the first protruding portions 21, that is, four second protruding portions 28, are provided. The second protruding portions 28 are formed into a spiral shape centered about the axis L in a view in the axis L direction. The rear end portions in the axis L direction of the first protruding portions 27 and the end portions on the inner side in the radial direction of the second protruding portions 28 are continuously connected to each other. The thickness in the axis L direction of the expanded portion 14 is greater at the portions at which the second protruding portions 28 are formed.

(Second Grommet 12)

As shown in FIGS. 2 and 3, the second grommet 12 is configured to close the opening on the rear end side in the axis L direction of the first grommet 11. The second grommet 12 includes a tube-shaped second tube-shaped portion 31 that covers the outer periphery of the wire harness W and a closing portion 31a that is extended toward the outer periphery from the second tube-shaped portion 31. The closing portion 31a is attached to the expanded portion 11a so as to close the expanded side of the expanded tube portion 11a of the first grommet 11. Also, in the state in which the grommet 10 is attached to the attachment hole Pa, the closing portion 31a is located on the inner peripheral side of the attachment hole Pa.

The cross-sectional shape of the second tube-shaped portion 31 orthogonal to the axis L of the grommet 10 has a circular ring shape that is centered about the axis L. The wire harness W is inserted into the second tube-shaped portion 31 in a state in which the water sealing property is ensured. The second tube-shaped portion 31 is formed with approximately the same radius as the first tube-shaped portion 13 of the first grommet 11.

The closing portion 31a includes an intermediate portion 32 that extends toward the outer periphery from the outer peripheral surface of the second tube-shaped portion 31, and a holding portion 33 that is provided on the outer peripheral edge of the intermediate portion 32.

The intermediate portion 32 that joins the second tube-shaped portion 31 and the holding portion 33 extends outward in the radial direction from the front end portion of the second tube-shaped portion 31. The intermediate portion 32 is formed into a ring shape about the second tube-shaped portion 31. The thickness in the axis L direction of the intermediate portion 32 is set to be approximately equal to the thickness in the radial direction of the second tube-shaped portion 31. Also, the intermediate portion 32 is flexible and the second tube-shaped portion 31 can move in the axis L direction with respect to the holding portion 33 due to the flexibility of the intermediate portion 32.

The holding portion 33 holds the joining piece 23 of the first grommet 11. Accordingly, the second grommet 12 is fixed to the first grommet 11 due to the holding portion 33 and the joining piece 23 being joined to each other.

As shown in FIGS. 2 and 4, the holding portion 33 includes a first brim portion 34 that is located on the frontward side in the axis L direction of the joining piece 23, and a second brim portion 35 that is located on the rearward side in the axis L direction of the joining piece 23. The first and second brim portions 34 and 35 are formed into circular ring shapes that protrude outward in the radial direction. A protrusion 36 that protrudes rearward in the axis L direction is formed on the outer peripheral edge of the first brim portion 34. The protrusion 36 is formed over the entire periphery of the first brim portion 34. The thickness in the axis L direction of the holding portion 33, that is, the dimension from the front end surface of the first brim portion 34 to the rear end surface of the second brim portion 35, is formed to be greater than the thickness in the axis L direction of the intermediate portion 32.

The joining piece 23 of the first grommet 11 is fit between the first and second brim portions 34 and 35. That is, the holding portion 33 holds the joining piece 23 with the first brim portion 34 and the second brim portion 35 such that it is sandwiched in the axis L direction. Also, the protruding portion 36 of the first brim portion 34 is located on the outer side in the radial direction of the protruding portion 24 of the joining piece 23. Accordingly, since the movement of the first brim portion 34 toward the inner side in the radial direction is suppressed by the protrusion 24 of the joining piece 23, the holding portion 33 is suppressed from coming out of the joining piece 23.

Also, the outer peripheral edge portion of the second brim portion 35 is fit between the joining piece 23 and the holding piece 25. That is, the holding piece 25 of the first grommet 11 holds the rearward side in the axis L direction of the second brim portion 35. According to this as well, the holding portion 33 can be suppressed from coming out of the joining piece 23.

As shown in FIGS. 3 and 4, in the state in which the first grommet 11 and the second grommet 12 are assembled, a sound insulation space S is formed between the inner peripheral surface of the expanded tube portion 11a and the closing portion 31a. The sound insulation space S spans between the expanded tube portion 11a that includes the expanded portion 14 and the seal portion 15, and the closing portion 31a that includes the intermediate portion 32 and the holding portion 33. Specifically, the expanded portion 14 and the first brim portion 34 of the holding portion 33 oppose each other in the axis L direction via the sound insulation space S. Also, the expanded portion 14 and the intermediate portion 32 oppose each other in the axis L direction via the sound insulation space S. Also, the end portion of the sound insulation space S expands to the space between the first brim portion 34 of the holding portion 33 and the inner peripheral surface of the seal portion 15 in the radial direction. Also, the seal portion 15 that opposes the first brim portion 34 of the holding portion 33 in the radial direction via the sound insulation space S is made thinner in the radial direction.

Next, the mode in which the grommet 10 is attached to the attachment hole Pa will be described.

First, the first grommet 11 and the second grommet 12 are made into an integrated product by fitting the joining piece 23 of the first grommet 11 into the holding portion 33 of the second grommet 12, and the integrated product is inserted into the attachment hole Pa. At this time, the grommet 10 is inserted from the first grommet 11 side. Also, the grommet 10 is attached to the attachment hole Pa from the side surface Pb side of the vehicle body panel P.

Figure 6:
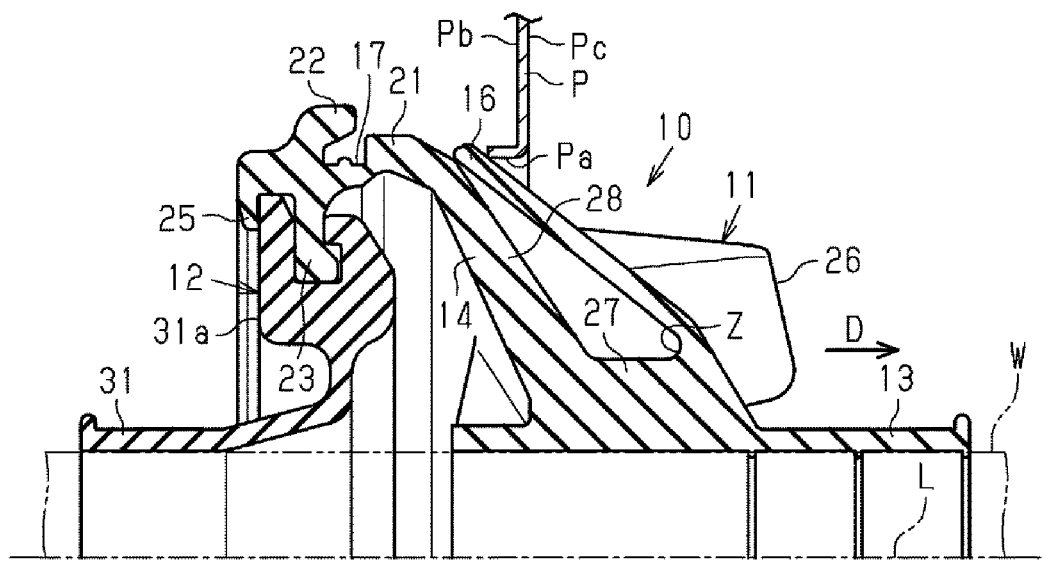
FIG. 6 is a cross-sectional view showing the grommet when attached in the embodiment.

First, the guide portions 26 of the covering portion 16 come into contact with the peripheral edge of the attachment hole Pa when the grommet 10 is inserted. Then, when the grommet 10 is pushed in, as shown in FIG. 6, the covering portion 16 including the guide portions 26 deform due to the contact with the peripheral edge of the attachment hole Pa so as to collapse rearward in the insertion direction D using a joining portion Z between the covering portion 16 and the end portions on the outer side in the radial direction of the first protruding portions 27 as a fulcrum. When the grommet 10 is further pressed in, the outer peripheral edge of the covering portion 16 comes out of the attachment hole Pa on the side surface Pc side. Then, the outer peripheral edge of the expanded portion 14 and the brim portion 21 deform toward the inner periphery due to contact with the peripheral edge of the attachment hole Pa, and thereafter the peripheral edge of the attachment hole Pa is fit into the outer peripheral groove 17.

The actions of the present embodiment will be described.

As shown in FIGS. 3 and 4, the sound insulation space S spans between the expanded tube portion 11a including the expanded portion 14 and the seal portion 15, and the closing portion 31a including the intermediate portion 32 and the holding portion 33. Accordingly, since the flexibility of the expanded tube portion 11a including the expanded portion 14 and the seal portion 15 is improved, the insertion resistance at the time of inserting the grommet 10 into the attachment hole Pa in the insertion direction D is reduced.

Also, in the present embodiment, the first grommet 11 and the second grommet 12 are separate components, and the sound insulation space S is formed between the first grommet 11 and the second grommet 12. For this reason, the sound insulation of the grommet 10 can be improved by setting the thickness in the axis L direction of the closing portion 31a of the second grommet 12 while the sound insulation space S is formed inside of the expanded tube portion 11a of the first grommet 11.

Also, in the present embodiment, the grommet 10 is suppressed from coming out of the attachment hole Pa due to the joining piece 23 of the first grommet 11 that is joined to the holding portion 33 of the second grommet 12 being formed on the inner side in the radial direction of the lip portion 22.

As shown in FIG. 4, for example, when the wire harness W is pulled toward the rearward side in the axis L direction, the second tube-shaped portion 31 is accordingly pulled toward the rearward side (arrow X direction) in the axis L direction. At this time, the force applied to the second tube-shaped portion 31 in the arrow X direction is transmitted to the joining piece 23 on the first grommet 11 side via the intermediate portion 32 and the holding portion 33. Upon doing so, the joining piece 23 rotates rearward in the axis L direction (arrow A1 direction) using the seal portion 15 engaged with the peripheral edge of the attachment hole Pa as a fulcrum.

Accompanying this, the lip portion 22 is displaced in the direction of being pressed to the side surface Pb of the vehicle body panel P (arrow A2 direction). Accordingly, the grip force by which the lip portion 22 grips the peripheral edge of the attachment hole Pa is improved, and as a result, when the second tube-shaped portion 31 is pulled toward the rearward side in the axis L direction, the grommet 10 is less likely to come out of the attachment hole Pa.

Also, in the present embodiment, a gap (part of the sound insulation space S) is formed between the holding portion 33 and the brim portion 21 in the radial direction. For this reason, the thickness in the radial direction of the portion on the inner side in the radial direction of the brim portion 21, specifically, the connection portion between the brim portion 21 and the portion on the inner side in the radial direction of the outer peripheral groove 17 and the portion on the inner side in the radial direction of the outer peripheral groove 17 can be formed to be thin. Accordingly, when the second tube-shaped portion 31 is pulled rearward in the axis L direction, the thin portion is more likely to deform, and as a result, the lip portion 22 is even more likely to deform toward the side surface Pb side of the vehicle body panel P.

Also, as shown in FIG. 3, the first protruding portions 27 that protrudes outward in the radial direction from the outer peripheral surface of the first tube-shaped portion 13 and connects to the side surface (side surface on the rearward side in the axis L direction) on the expanded tube portion 11a side in the axial direction of the covering portion 16 are formed between the covering portion 16 and the expanded tube portion 11a. In this configuration, the connection portion Z between the covering portion 16 and the end portions on the outer side in the radial direction of the first protruding portions 27 acts as a fulcrum for deformation at the time when the covering portion 16 abuts on the peripheral edge of the attachment hole Pa and collapses during attachment of the grommet 10. Accordingly, compared to the case in which the first protruding portions 27 are not formed on the first tube-shaped portion 13, the amount by which the portion on the outer side in the radial direction of the covering portion 16 is displaced toward the rearward side in the axis L direction (that is, the collapsing amount of the covering portion 16) can be suppressed to a small amount. As a result, when the grommet 10 is inserted into the attachment hole Pa, the covering portion 16 is less likely to be caught between the attachment hole Pa and the expanded tube portion 11a.

The effect of the present embodiment will be described.

(1) The first protruding portions 27 that protrude outward in the radial direction from the outer peripheral surface of the first tube-shaped portion 13 and connects to the side surface (side surface on the rearward side in the axis L direction) on the expanded tube portion 11a side in the axial direction of the covering portion 16 are formed between the covering portion 16 and the expanded tube portion 11a. According to this configuration, the connecting portion Z between the covering portion 16 and the end portions on the outer side in the radial direction of the first protruding portions 27 that protrude from the outer peripheral surface of the first tube-shaped portion 13 acts as a fulcrum for deformation when the covering portion 16 abuts on the peripheral edge of the attachment hole Pa and collapses during attachment of the grommet 10. That is, due to the first protruding portions 27 being formed, the connecting portion Z that acts as a fulcrum when collapsing rearward in the insertion direction D can be formed further outward in the radial direction compared to the case where the first protruding portions 27 are not formed onto the first tube-shaped portion 13. Accordingly, the amount of displacement (that is, the collapsing amount of the covering portion 16) in the axial direction of the end portion on the outer side in the radial direction of the covering portion 16 can be suppressed to a small amount due to the first protruding portions 27 being formed. As a result, it is possible to achieve a configuration in which the covering portion 16 is not likely to be caught between the attachment hole Pa and the expanded tube portion 11a when the grommet 10 is inserted into the attachment hole Pa, and the insertability of the grommet 10 into the attachment hole Pa can be improved.

(2) The multiple first protruding portions 27 are provided with intervals therebetween in the peripheral direction. According to this configuration, it is possible to more suitably suppress the covering portion 16 from being caught in the attachment hole Pa using the multiple first protruding portions 27. Also, the amount of the material of the grommet 10 can be suppressed to a small amount compared to the case where the first protruding portions 27 are formed over the entire periphery of the first tube-shaped portion 13.

(3) The first protruding portions 27 are formed along the axial direction from the covering portion 16 to the expanded tube portion 11a. According to this configuration, warping of the first protruding portions 27 is suppressed due to the first protruding portions 27 being connected to the expanded tube portion 11a, and as a result, it is possible to more suitably suppress the amount of displacement in the axial direction of the end portion on the outer side in the radial direction of the covering portion 16 using the first protruding portions 27.

(4) The second protruding portions 28 that extend in the radial direction in a view in the axial direction are formed on the outer peripheral surface of the expanded tube portion 11a, and the second protruding portions 28 are connected to the end portions in the axial direction of the first protruding portions 27. According to this configuration, the rigidity of the expanded tube portion 11a can be improved by the second protruding portions 28.

(5) The joining piece 23 of the first grommet 11 that is joined to the holding portion 33 of the second grommet 12 is formed on the inner side in the radial direction of the lip portion 22. According to this configuration, when the wire harness W is pulled toward the second tube-shaped portion 31, the force that acts on the second tube-shaped portion 31 toward the outer side in the axial direction is transmitted to the joining piece 23 on the first grommet 11 side via the holding portion 33. Here, due to the fact that the joining piece 23 is located on the inner side in the radial direction of the lip portion 22 of the seal portion 15, the pulling force transmitted to the joining piece 23 can act such that the lip portion 22 is pressed to the second side surface of the vehicle body panel P. Accordingly, when the wire harness W is pulled toward the second tube-shaped portion 31, the holding force that acts on the attachment hole Pa of the grommet 10 improves, and the grommet 10 is less likely to come out of the attachment hole Pa.

(6) A gap (part of the sound insulation space S) is formed between the holding portion 33 and the brim portion 21. According to this configuration, the thickness in the radial direction at the portion on the inner side in the radial direction of the brim portion 21 is reduced, and as a result, when the wire harness W is pulled toward the second tube-shaped portion 31, the lip portion 22 is even more likely to deform to the side of being pressed to the second side surface of the vehicle body panel P. Accordingly, the holding force on the attachment hole Pa of the grommet 10 can be further improved.

(7) The joining piece 23 protrudes inward in the radial direction from the inner peripheral surface of the seal portion 15, and the holding portion 33 holds the joining piece 23 such that it is sandwiched in the axial direction. According to this configuration, when the wire harness W is pulled toward the second tube-shaped portion 31, force can be suitably transmitted from the joining piece 23 to the lip portion 22.

(8) The attachment hole Pa includes a protruding portion Pd that protrudes toward the second side surface from the peripheral edge of the attachment hole Pa, and the lip portion 22 protrudes to the outer side in the radial direction of the protruding portion Pd. According to this configuration, when the wire harness W is pulled toward the first tube-shaped portion 13, the lip portion 22 catches on the protruding portion Pd on the peripheral edge of the attachment hole Pa. For this reason, when the wire harness W is pulled toward the first tube-shaped portion 13, the grommet 10 is less likely to come out of the attachment hole Pa.

(9) The holding portion 33 is formed on the outer peripheral edge of the closing portion 31a that closes the opening on the seal portion 15 side of the first grommet 11 in the axial direction. According to this configuration, the closing portion 31a of the second grommet 12 closes the opening on the seal portion 15 side of the first grommet 11, and therefore it is possible to improve the sound insulation of the grommet 10. Also, since the holding portion 33 is formed on the outer peripheral edge of the closing portion 31a, a suitable configuration is achieved in which the holding portion 33 is also part of the closing portion 31a.

(10) The sound insulation space S is formed between the inner peripheral surface of the expanded tube portion 11a of the first grommet 11 and the closing portion 31a of the second grommet 12. Accordingly, the sound insulation can be improved by increasing the thickness of the closing portion 31a of the second grommet 12 while ensuring flexibility of the expanded tube portion 11a by leaving the sound insulation space S on the inner side of the expanded tube portion 11a of the first grommet 11. Accordingly, the sound insulation of the grommet 10 can be improved by the closing portion 31a of the second grommet 12 while suppressing the insertion resistance with respect to the attachment hole Pa to a small amount using the flexibility of the expanded tube portion 11a of the first grommet 11. Furthermore, the sound insulation space S formed between the inner peripheral surface of the expanded tube portion 11a and the closing portion 31a also contributes to improving the sound insulation of the grommet 10.

Also, by making the first grommet 11 and the second grommet 12 separate, the sound insulation space S is formed inside of the grommet 10. Accordingly, the hole that is needed for injection molding when the grommet having the sound insulation space S is formed using one component is not needed due to the first grommet 11 and the second grommet 12 being separate components. Accordingly, the attachment hole Pa can be more suitably airtightly sealed.

(11) Since the closing portion 31a is provided on the inner side in the radial direction of the seal portion 15 located on the end portion on the rearward side of the expanded tube portion 11a, it is possible to ensure a wider sound insulation space S inside of the expanded tube portion 11a. Accordingly, the sound insulation of the grommet 10 can be further improved.

(12) Part of the sound insulation space S is interposed between the seal portion 15 and the closing portion 31a in the radial direction. Accordingly to this configuration, the flexibility of the seal portion 15 can be improved due to the gap interposed between the seal portion 15 and the closing portion 31a in the radial direction (part of the sound insulation space S). Accordingly, the insertion resistance of the grommet 10 with respect to the attachment hole Pa can be more suitably suppressed.

(13) The expanded tube portion 11a of the first grommet 1 includes the joining piece 23 that extends from the inner peripheral surface of the expanded tube portion 11a. On the other hand, the closing portion 31a of the second grommet 12 includes the holding portion 33 that holds the joining piece 23 such that the joining piece 23 is sandwiched. According to this configuration, it is possible to realize a joining structure between the first grommet 11 and the second grommet 12 in which the closing portion 31a is thicker at the holding portion 33 sandwiching the joining piece 23 while the volume of the expanded tube portion 11a is suppressed to a small amount. Accordingly, a more suitable configuration is achieved in which both suppression of the insertion resistance and improvement of the sound insulation are achieved.

The present embodiment can be implemented with the following modifications. The present embodiment and the following modified examples can be implemented in combination with each other as long as there are no technical discrepancies.

A configuration may also be used in which no gap is set between the holding portion 33 and the brim portion 21 in the radial direction. That is, a configuration may also be used in which the holding portion 33 and the inner side surface in the radial direction of the brim portion 21 come into contact with each other with no gap.

A joining structure may also be used in which the joining piece 23 and the holding portion 33 are structurally replaced. That is, a joining structure may also be used in which the joining portion on the first grommet 11 side sandwiches the joining portion on the second grommet 12 side in the axis L direction.

The joining piece 23 may also be formed so as to be located on the inner side in the radial direction of the outer peripheral groove 17 or on the inner side in the radial direction of the brim portion 21.

A configuration may also be used in which the expanded tube portion 11a including the second protruding portions 28 and the first protruding portions 27 are not directly connected to each other and are spaced apart from each other.

Configurations such as the numbers and shapes of the first protruding portions 27 and the second protruding portions 28 are not limited to the above-described embodiment and can be changed as appropriate according to the configuration of the grommet 10.

The covering portion 16 is not necessarily needed, and the covering portion 16 may also be omitted according to the configuration on the vehicle body panel P side.

It is also possible to use a configuration in which the second grommet 12 is omitted.

The shape of the covering portion 16 viewed from the axis L direction is not limited to a circular shape, and for example, may also be a polygonal shape.

The shape of the seal portion 15 viewed from the axis L direction is not limited to a circular shape, and can be changed as appropriate to, for example, an elliptical shape or the like according to the shape of the attachment hole Pa.

The elastic material used in the grommet 10 is not limited to EPDM, and it is also possible to use, for example, NBR (acrylonitrile butadiene rubber) or the like.

In the present embodiment, the protruding portion Pd on the peripheral edge of the attachment hole Pa protrudes to the exterior, but there is no limitation to this, and a configuration may also be used in which the protruding portion Pd protrudes to the interior. A configuration may also be used in which the grommet 10 is inserted into the attachment hole Pa from the interior.

A configuration may also be used in which the protruding portion Pd on the peripheral edge of the attachment hole Pa is inclined with respect to the axis L. A configuration may also be used in which the protruding portion Pd is omitted from the attachment hole Pa (i.e., a configuration in which burring is not carried out on the attachment hole Pa).

The technical idea that can be understood based on the above-described embodiment and modified examples will be described hereinafter.

(A) A grommet that is to be interposed between an attachment hole provided in a vehicle body panel and a wire harness passed through the attachment hole, the grommet including: a first grommet and a second grommet that are separated from each other, in which the first grommet includes a first tube-shaped portion for covering an outer periphery of the wire harness and an expanded tube portion that expands in diameter and extends from the first tube-shaped portion, and at an end portion on the expanded side, has a seal portion into which a peripheral edge of the attachment hole is to be fit, the second grommet includes a second tube-shaped portion for covering the outer periphery of the wire harness and a closing portion that is extended toward the outer periphery from the second tube-shaped portion and is attached to the expanded tube portion so as to close the expanded side of the expanded tube portion, and a sound insulation space is formed between the inner peripheral surface of the expanded tube portion and the closing portion.

According to this configuration, the sound insulation can be improved by increasing the thickness of the closing portion of the second grommet while ensuring the flexibility of the expanded tube portion by leaving the sound insulation space inside of the expanded tube portion in the first grommet. Accordingly, the sound insulation of the grommet can be improved by the closing portion of the second grommet while suppressing the insertion resistance with respect to the attachment hole to a small amount using the flexibility of the expanded tube portion of the first grommet. Furthermore, in the above-described configuration, the sound insulation space formed between the inner peripheral surface of the expanded tube portion and the closing portion also contributes to improvement of the sound insulation of the grommet.

(B) The closing portion is provided on the inner side in the radial direction of the seal portion.

According to this configuration, the sound insulation space on the inner side of the expanded tube portion can be more suitably ensured.

(C) Part of the sound insulation space is interposed between the seal portion and the closing portion in the radial direction.

According to this configuration, part of the sound insulation portion is interposed between the seal portion and the closing portion in the radial direction, whereby the flexibility of the seal portion can be improved. Accordingly, the insertion resistance of the grommet with respect to the attachment hole can be more suitably suppressed.

(D) The expanded tube portion includes a joining piece that extends from the inner peripheral surface of the expanded tube portion, and the closing portion includes a holding portion that holds the joining piece such that the joining piece is sandwiched.

According to this configuration, it is possible to realize a joining structure between the first grommet and the second grommet in which the thickness of the closing portion is increased at a holding portion sandwiching the joining piece while the volume of the expanded tube portion is suppressed to a small amount. Accordingly, a more suitable configuration is achieved in which both suppression of the insertion resistance and improvement of the sound insulation are achieved.

(E) A grommet configured to be interposed between an attachment hole provided in a vehicle body panel and a wire harness passed through the attachment hole, including a first grommet and a second grommet that are separate from each other. The first grommet includes a first tube-shaped portion for covering an outer periphery of the wire harness, a ring-shaped seal portion into which a peripheral edge of the attachment hole is to be fit, and a first joining portion. The second grommet includes a second tube-shaped portion for covering the outer periphery of the wire harness and a second joining portion that is joined to the first joining portion. The first tube-shaped portion is located on a first side surface side of the vehicle body panel with respect to the vehicle body panel. The second tube-shaped portion is located on a second side surface side of the vehicle body panel with respect to the vehicle body panel. The seal portion includes a first flange portion that is engaged with the first side surface and a second flange portion that is engaged with the second side surface of the vehicle body panel. The first joining portion is formed on an inner side in a radial direction of the second flange portion.

According to this configuration, when the wire harness is pulled toward the second tube-shaped portion, the force acting on the second tube-shaped portion is transmitted to the first joining portion on the first grommet side via the second joining portion. Here, due to the fact that the first joining portion is located on the inner side in the radial direction of the second flange portion of the seal portion, the pulling force that is transmitted to the first joining portion can act so as to press the second flange portion to the second side surface of the vehicle body panel. Accordingly, when the wire harness is pulled toward the second tube-shaped portion, the holding force on the attachment hole of the grommet improves, and the grommet is less likely to come out of the attachment hole.

(F) A gap is formed between the second joining portion and the first flange portion in the radial direction.

According to this configuration, the thickness in the radial direction of the portion of the first flange portion on the inner side in the radial direction is reduced, and as a result, when the wire harness is pulled toward the second tube-shaped portion, it is even more likely to deform to the side on which the second flange portion is pressed to the second side surface of the vehicle body panel. Accordingly, the holding force on the attachment hole of the grommet can be further improved.

(G) The first joining portion is extended inward in the radial direction from the inner peripheral surface of the seal portion, and the second joining portion holds the first joining portion such that the first joining portion is sandwiched in the axial direction.

According to this configuration, when the wire harness is pulled toward the second tube-shaped portion, force can be suitably transmitted from the first joining portion to the second flange portion.

(H) The attachment hole includes a protruding portion that protrudes toward the second side surface from a peripheral edge of the attachment hole, and the second flange portion is extended to the outer side in the radial direction of the protruding portion.

According to this configuration, when the wire harness is pulled toward the first tube-shaped portion, the second flange portion catches on the protruding portions on the peripheral edge of the attachment hole. For this reason, when the wire harness is pulled toward the first tube-shaped portion, the grommet is not likely to come out of the attachment hole.

(I) The second grommet includes a closing portion that is extended toward the outer periphery from the second tube-shaped portion, the closing portion closes an opening on the seal portion side of the first grommet in the axial direction, and the second joining portion is formed on the outer peripheral edge of the closing portion.

According to this configuration, the closing portion of the second grommet closes the opening on the shield portion side of the first grommet, and therefore it is possible to improve acoustic insulation of the grommet. Also, since the second joining portion is formed on the outer peripheral edge of the closing portion, a suitable configuration is achieved in which the second joining portion is also a portion of the closing portion.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A grommet including comprising:
   a grommet main body portion interposed between an attachment hole provided in a vehicle body panel and a wire harness that passes through the attachment hole, and
   a covering portion configured to cover an insertion hole in a sound insulation member provided on one side surface of the vehicle body panel,
   wherein the grommet main body portion includes:
      a tube-shaped portion configured to cover an outer periphery of the wire harness, and
      an expanded tube portion that expands in diameter and extends from the tube-shaped portion, and has a seal portion to which a peripheral edge of the attachment hole is fitted, at an end portion of the expanded tube portion at a side where the expanded tube portion expands,
      the covering portion extends from an outer peripheral surface of the tube-shaped portion in a state of being inclined toward the expanded tube portion in the axial direction of the tube-shaped portion, and
      a protruding portion protruding outward in the radial direction from the outer peripheral surface of the tube-shaped portion, and directly connected to a side surface of the covering portion that is positioned at a side where the expanded tube portion is provided in the axial direction of the tube-shaped portion, the protruding portion being formed between the covering portion and the expanded tube portion.

2. The grommet according to claim 1, wherein a plurality of the protruding portions are provided with intervals therebetween in the peripheral direction.

3. The grommet according to claim 1, wherein the protruding portion is formed along the axial direction of the tube-shaped portion from the covering portion to the expanded tube portion.

4. The grommet according to claim 3, wherein the protruding portion is a first protruding portion,
   a second protruding portion that extends in a radial direction in a view from the axial direction is formed on the outer peripheral surface of the expanded tube portion, and
   the second protruding portion is connected to an end portion of the first protruding portion in the axial direction of the tube-shaped portion.

5. The grommet according to claim 1, wherein the protruding portion is directly connected to a side surface of the expanded tube portion that is positioned at a side where the covering portion is provided.

* * * * *